United States Patent [19]
Haggerty

[11] Patent Number: 5,816,334
[45] Date of Patent: Oct. 6, 1998

[54] APPARATUS FOR SEPARATING DEBRIS FROM TOPSOIL

[76] Inventor: Barry Haggerty, R.D. 3, Box 114B, Little Falls, N.Y. 13365

[21] Appl. No.: 890,497

[22] Filed: Jul. 9, 1997

[51] Int. Cl.$^6$ ..................................................... A01D 17/00
[52] U.S. Cl. ............................................................... 171/63
[58] Field of Search .............................. 171/63, 71, 117, 171/132, 130

[56] References Cited

U.S. PATENT DOCUMENTS

| | | |
|---|---|---|
| 750,029 | 1/1904 | Grohmann . |
| 849,577 | 4/1907 | Sebrell . |
| 1,178,634 | 4/1916 | Drewes . |
| 1,494,458 | 5/1924 | Campbell . |
| 1,747,154 | 2/1930 | McWilliams . |
| 1,808,133 | 6/1931 | Firman . |
| 1,819,092 | 8/1931 | Hall . |
| 2,145,763 | 1/1939 | Gill . |
| 4,014,390 | 3/1977 | Teixeira ................................... 171/124 |
| 4,241,792 | 12/1980 | Kratzer ....................................... 171/63 |
| 4,482,019 | 11/1984 | Murphy ...................................... 171/63 |

Primary Examiner—Michael J. Carone
Assistant Examiner—Christopher J. Novosad
Attorney, Agent, or Firm—George R. McGuire

[57] ABSTRACT

An apparatus for simultaneously separating debris from topsoil and re-spreading the debris-free soil on the ground. The apparatus consists of a conventional, earth moving tractor to which a chassis is mounted and which carries a plurality of soil treating devices in series. The chassis includes a soil carrying and conveying paddle assembly mounted across the width of its front end which scoops up the debris laden soil off the ground. A conventional, vibrating table for separating the debris from the soil is mounted across the width of the chassis, adjacent to the paddle assembly, and the debris-laden soil is deposited onto the vibrating table from the paddle assembly. Once the vibrating table has separated the debris from the soil, the soil falls through the chassis' open bottom back to the ground, and the debris is ultimately moved to a conveyor assembly. The conveyor assembly carries the debris from the vibrating table and deposits it in a collection bin mounted across the back width of the chassis. The collection bin includes an alarm system to indicate to a driver of the tractor when the bin is full, and further includes a trap door assembly in the bin's bottom which permits the driver to selectively open or close the door from the driver's compartment. Hence, the driver is alarmed as to when the bin is full, and may then drive the apparatus to a refuse dump site, remotely open the trap door assembly, and then remotely close the door and continue working.

17 Claims, 12 Drawing Sheets

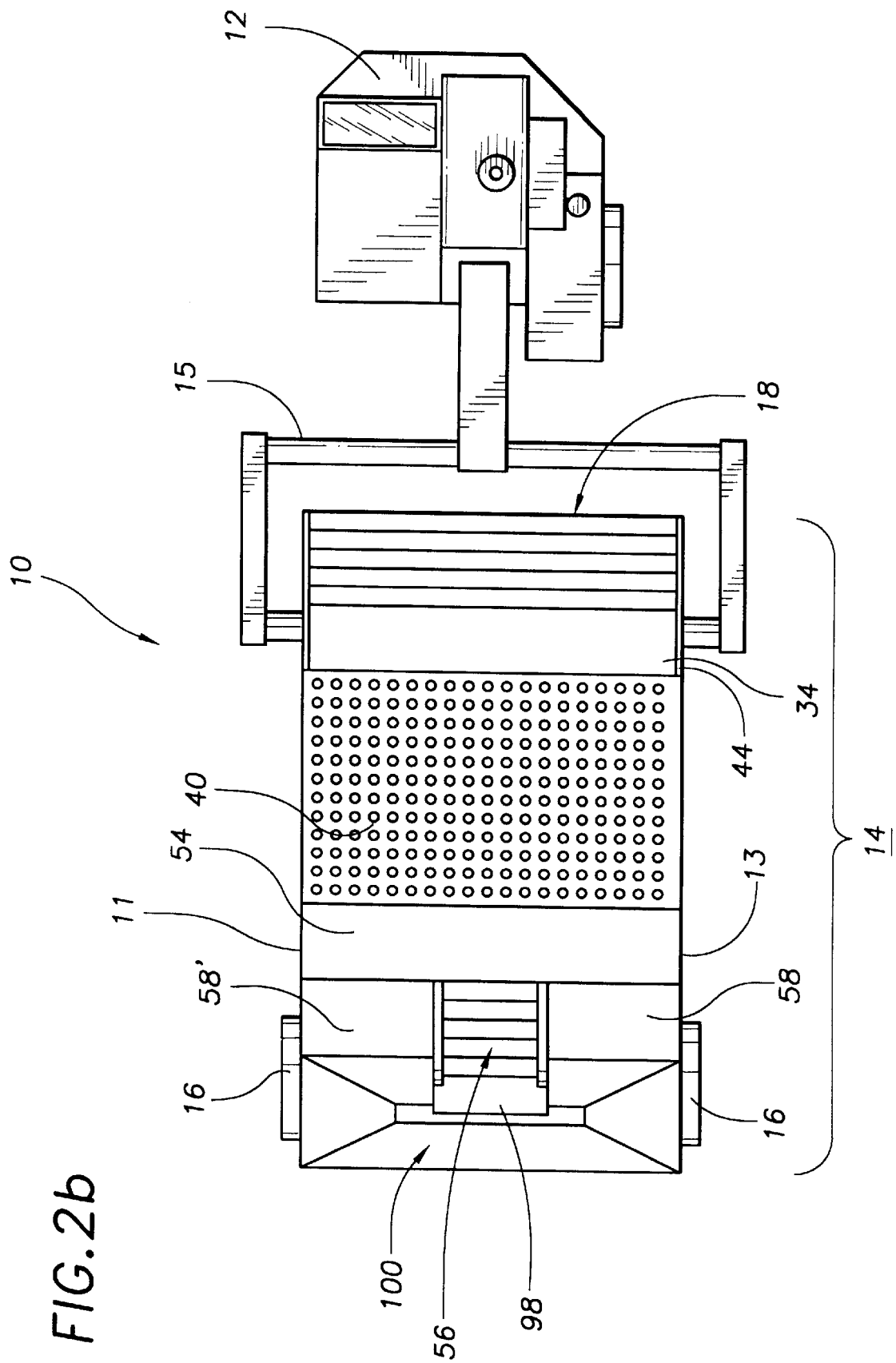

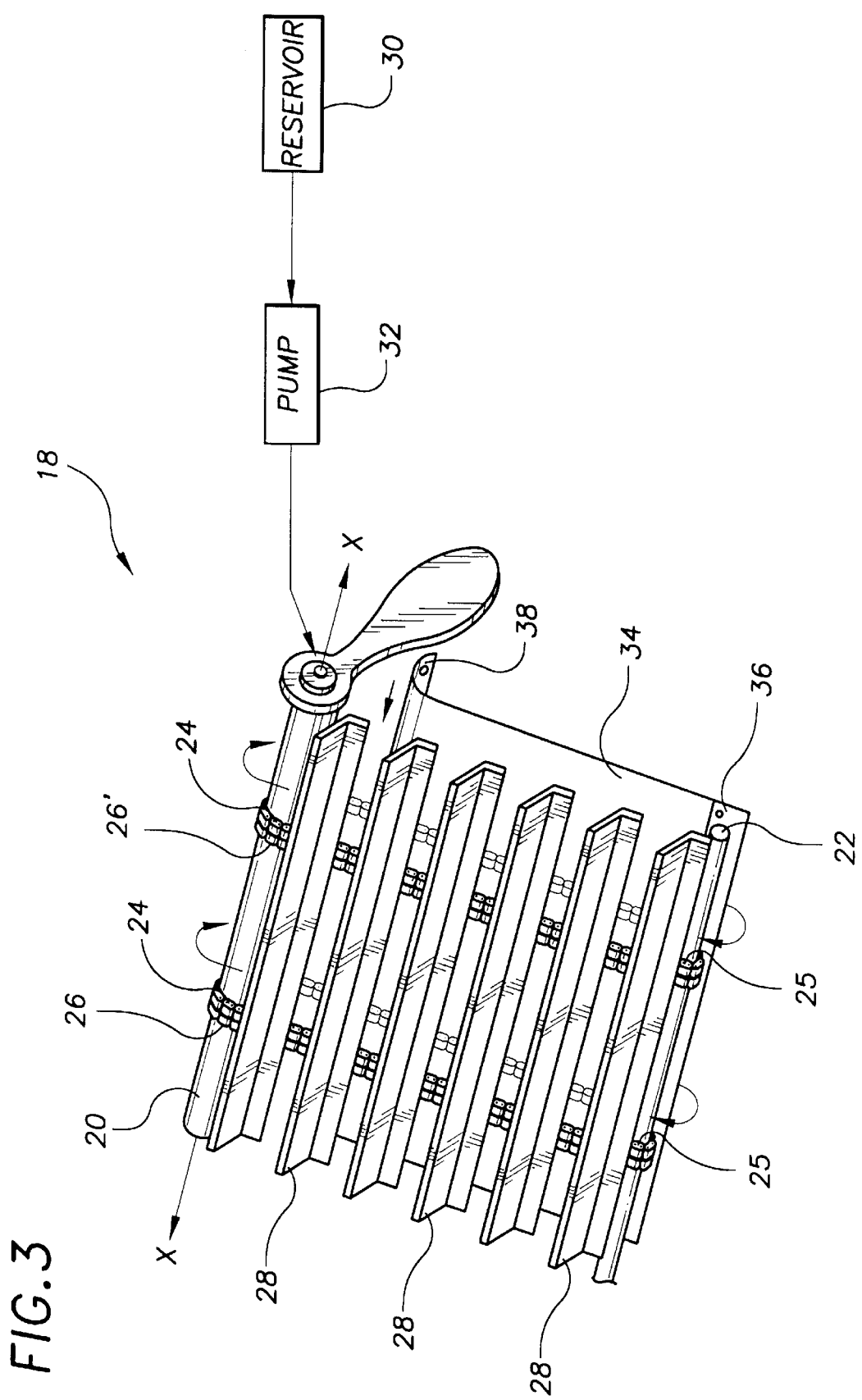

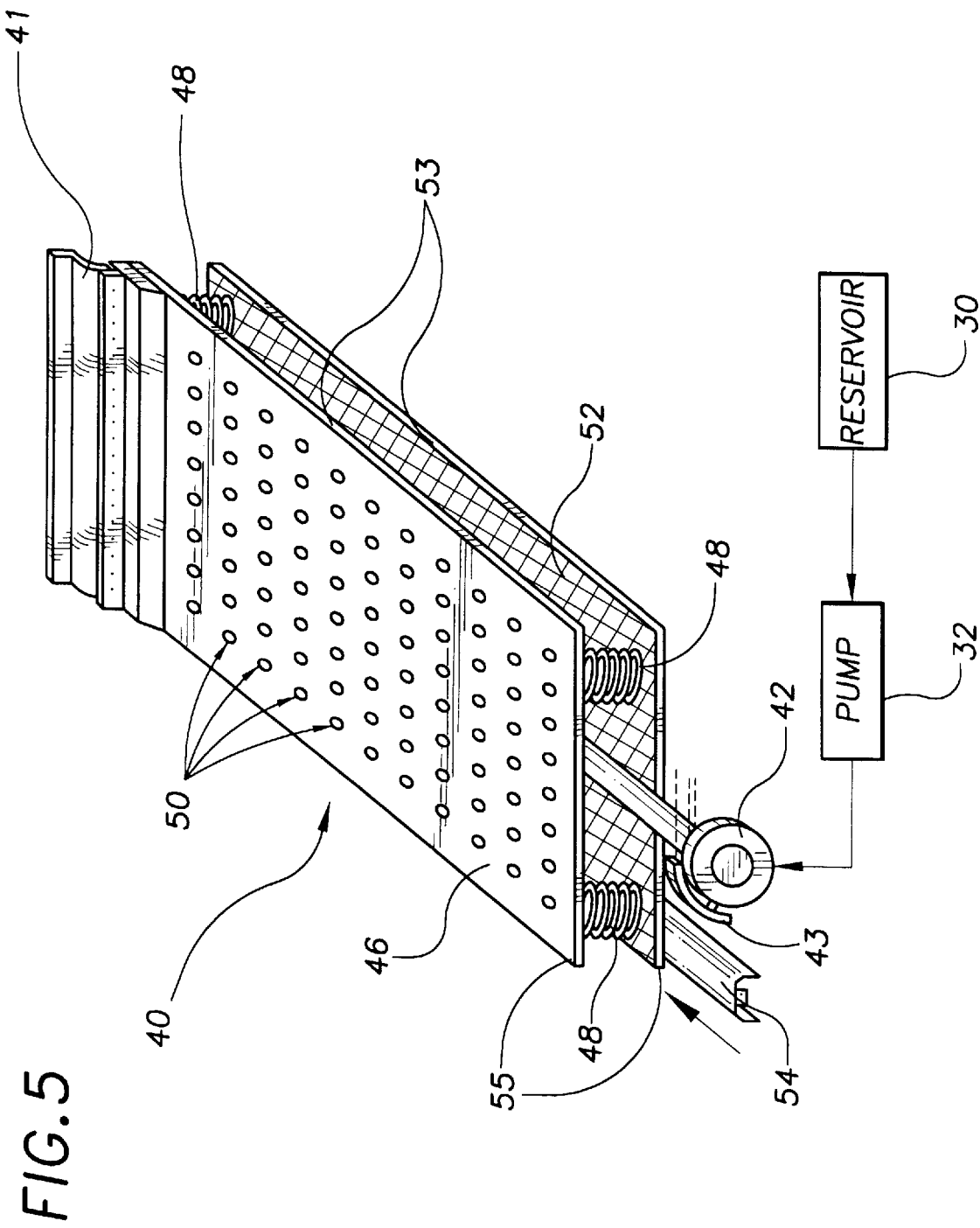

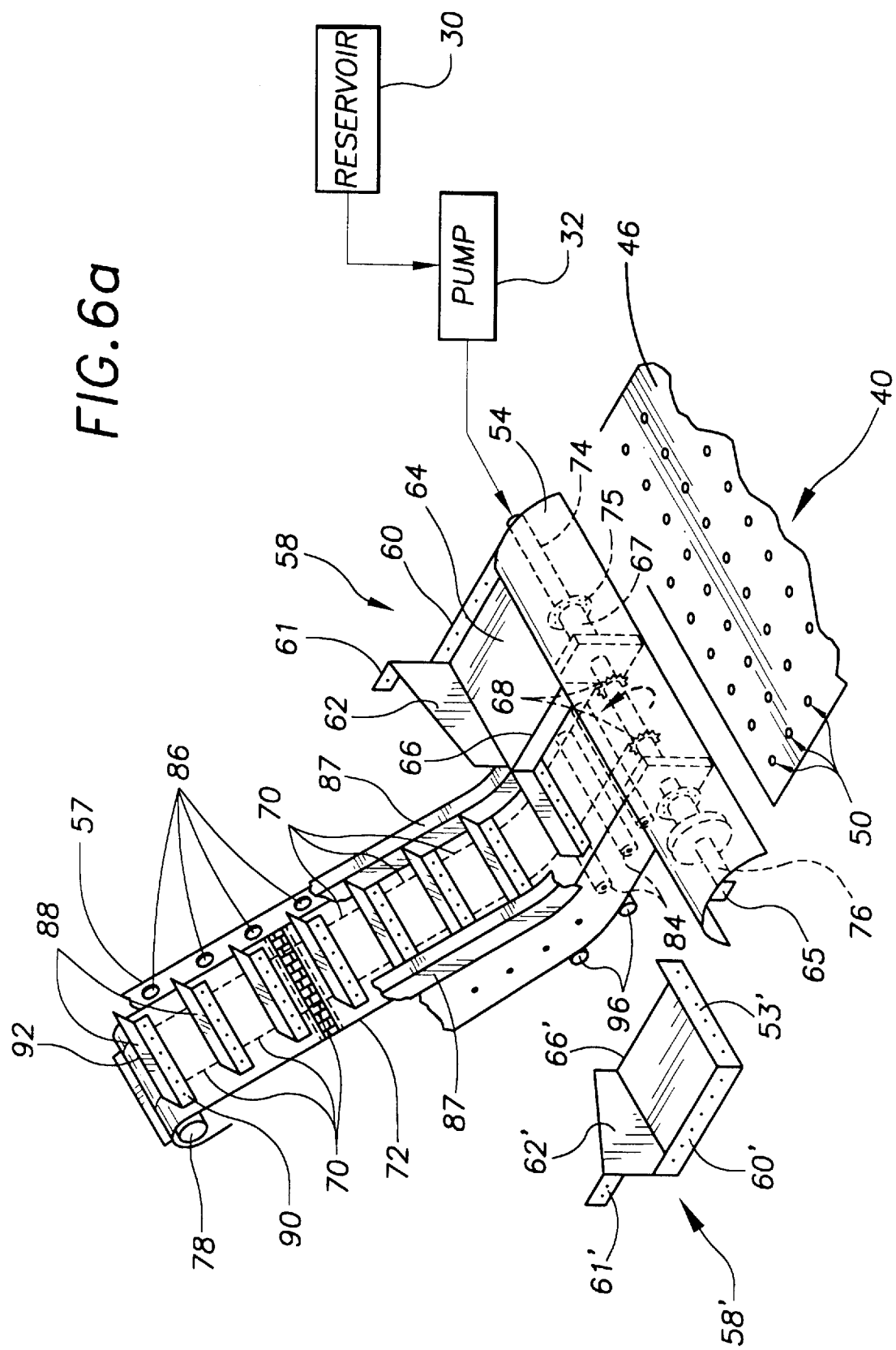

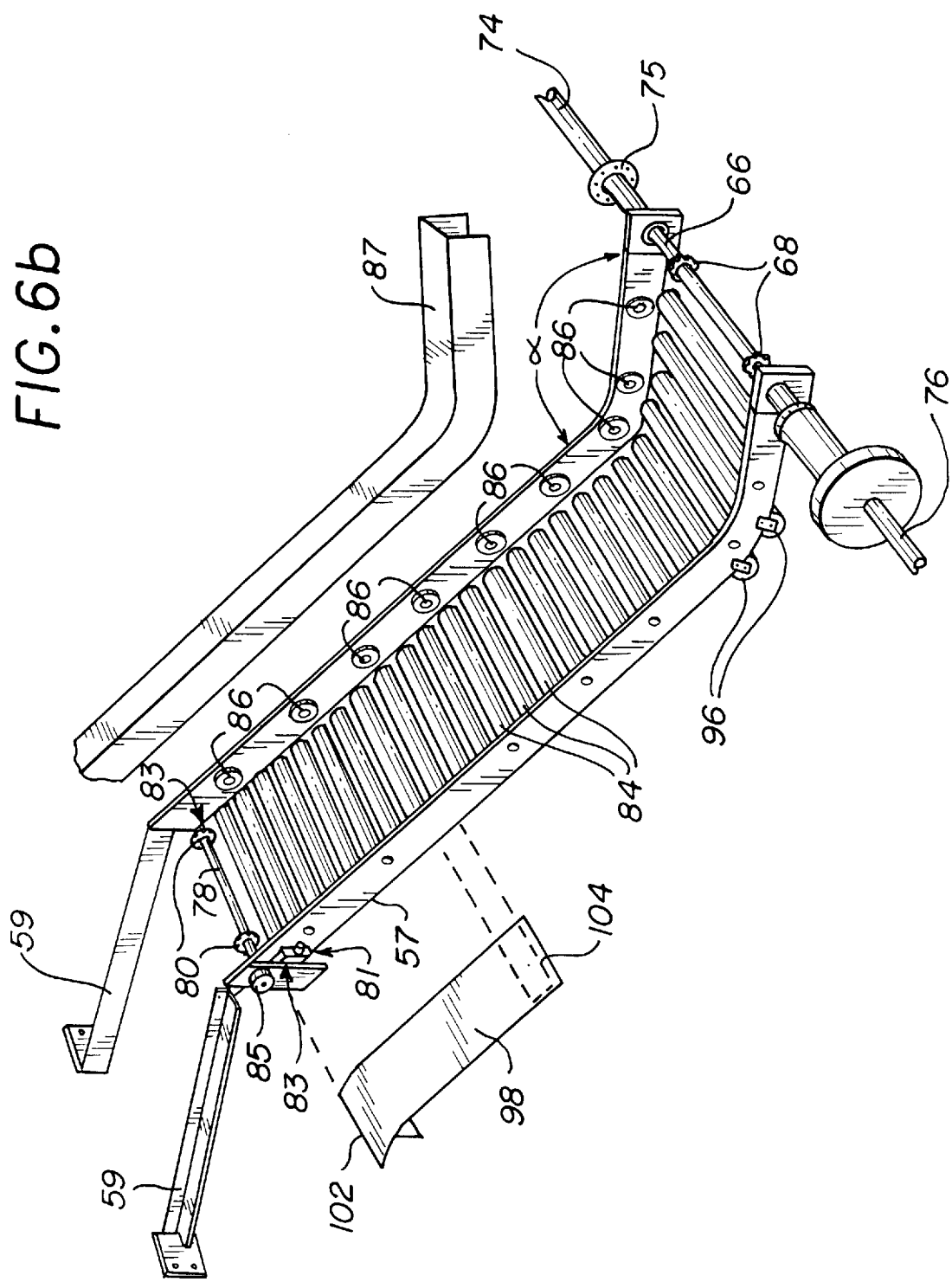

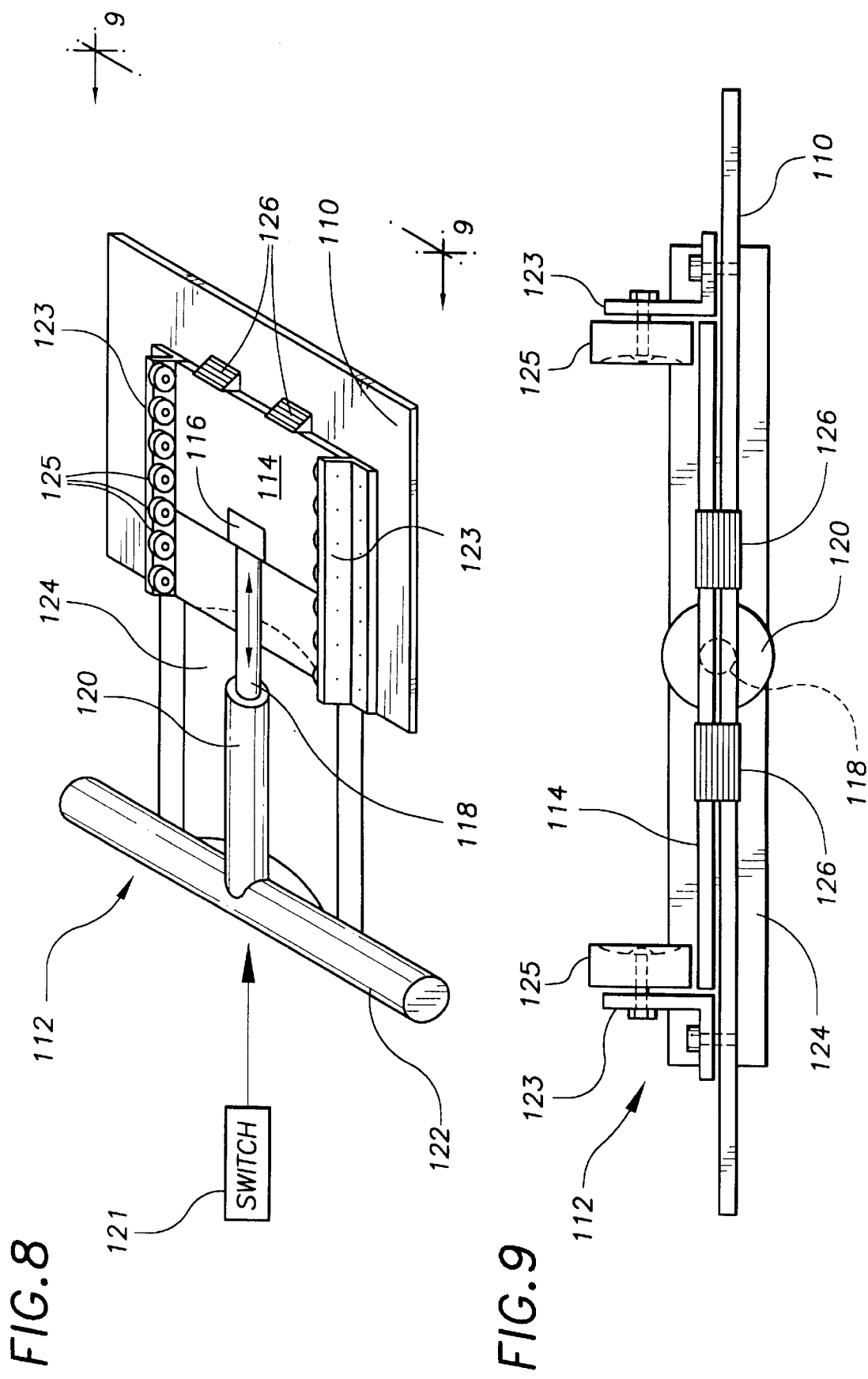

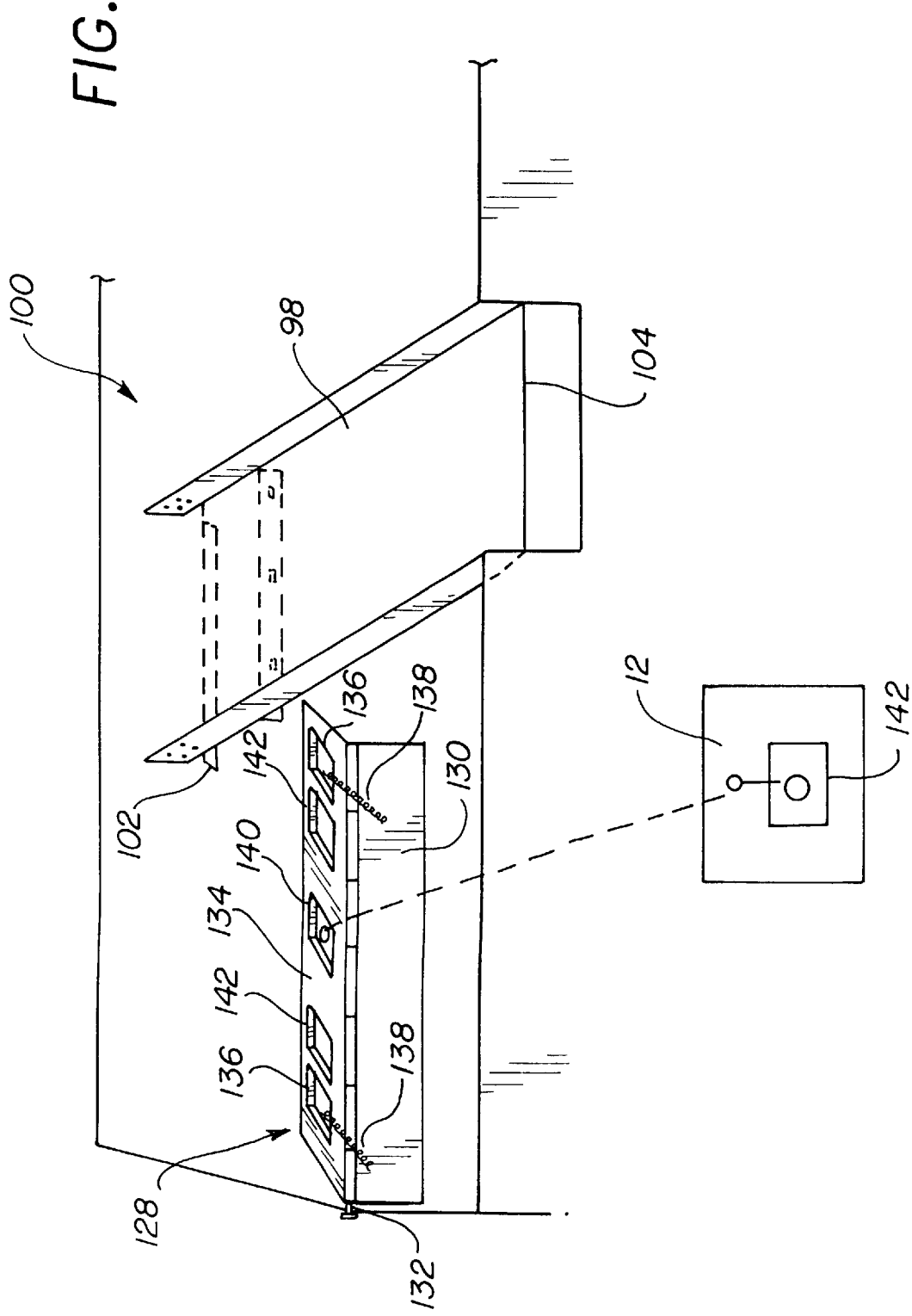

APPARATUS FOR SEPARATING DEBRIS FROM TOPSOIL

BACKGROUND OF THE INVENTION

The present invention generally relates to apparatus for separating rocks and other debris from topsoil, and more particularly to such apparatus having capabilities for carrying the material, separating out the debris, and collecting the debris for subsequent disposal.

In virtually all forms of construction jobs, one of the initial processes performed by the contractor is the excavating and grading of the supporting ground. Depending on the type of construction being done, it may further be necessary to separate rocks and other debris from the soil, or to simply break up clumps of soil that contain excessive clay. This process can be very costly due to its time and labor intensive nature.

Conventionally, separating debris from soil is done by first, using a dozer to form a main stockpile of soil. A shaker screen (preferably powered) for separating the debris from the soil may then be set up near the stockpile. By using a payloader the soil is then loaded onto the shaker (vibrating) screen and the rocks and debris are separated from the soil. The clean soil may then be re-stockpiled and the rocks and debris loaded onto a truck and taken to the waste collection area on the construction site. Finally, the clean soil can be spread over the ground by a dozer and rough graded to its desired thickness (most commonly 4–6 inches) by a tractor or other machine.

There have been a few patented machines which attempt to make the above described process more efficient. U.S. Pat. Nos. 4,014,390 to Teixeira; 1,494,458 to Campbell; and 750,029 to Grohmann disclose various apparatus for loading and screening sand or dirt and collecting the debris in an integral container. Other U.S. patents, such as U.S. Pat. Nos. 1,178,634 to Drewes and 1,808,133 to Firman disclose apparatus for harvesting potatoes by loading soil containing potatoes onto a screen to separate the dirt from each potato, and then conveying the potatoes into a collection bin.

It is a principal object of the present invention to provide an apparatus which more efficiently and effectively separates rocks and other debris from topsoil, as compared to the prior art devices.

It is another object of the present invention to provide an apparatus that is easily manufactured based on existing machinery.

It is a further object of the present invention to provide an apparatus which is versatile in its construction applications.

Other objects and advantages of the present invention will in part be obvious, and in part appear hereinafter.

SUMMARY OF THE INVENTION

In accordance with the foregoing objects and advantages, the present invention provides a mobile, soil treating apparatus capable of separating rocks and debris from topsoil, and collecting a large quantity of debris in an integral collection bin. The apparatus is generally comprised of a series of soil treating mechanisms securely mounted within a chassis which is adapted to be removably attached to and pulled behind a conventional, earth moving tractor.

Mounted to the front end of the chassis is a paddle assembly which includes a plurality of elongated paddles extending across the width of the chassis in essentially parallel relation to the ground. The paddles are connected to a pair of laterally spaced chain drives which extend around upper and lower drive shafts. The upper shaft is hydraulically driven to cause the chains, and hence the paddles, to revolve around the drive shafts, and ultimately carry soil to the next soil treating mechanism in the series.

A ramp is mounted to the chassis' sidewalls and extends across the entire width of the chassis directly behind and slanting under the paddle assembly. The bottom of the ramp includes a cutting edge which may be raised or lowered with respect to the ground to dig a desired depth into the soil to be treated. As the soil is dug up onto the ramp it is picked up by the paddles as they rotate around the lower drive shaft. Any soil that falls off of any paddle simply slides down the ramp until another paddle picks it up. The top edge of the ramp is curved downwardly, and as the soil carried by the paddles reaches the top of the paddle assembly, the soil falls from the paddles to the top of the ramp at which point the curvature of the ramp directs the soil to the next soil treating mechanism; namely, a vibratory screen.

A conventional, hydraulically powered shaker screen unit is securely attached to the chassis' sidewalls with its front edge positioned in vertically spaced relation below the soil directing ramp, thereby catching the soil that falls from the paddles and over the ramp. The shaker screen unit includes a plate having holes of predetermined size formed therethrough which is mounted to the top of several springs. The holes permit soil below the predetermined size to fall therethrough, while prohibiting debris above that size from falling through. The soil that falls through the plate passes through a lower screen having a finer mesh and which is mounted to the bottom of the springs, thereby further breaking up any soil clumps and catching any smaller stones. The soil then falls through the open floor of the chassis and onto the ground. The shaker unit is pitched downwardly from its front edge to its rear edge which, in combination with the vibratory nature of the unit, causes the debris which didn't pass through the mesh plate to run off the shaker unit and onto the next soil treating mechanism.

The debris that does not pass through the shaker unit eventually passes onto an upward sloping, hydraulically driven, conveyor belt. Several paddles are bolted to the belt in parallel, spaced relation to one another, each of which prevents debris from sliding down the belt as the belt travels on its upward pitch. Metal catch pans are positioned to the sides of the conveyor to catch any debris that may fall off the conveyor. The catch pans are pitched so as to redirect the debris back onto the conveyor.

The conveyor eventually dumps the debris it's carrying into a large collection bin positioned at the rear of the chassis. Once the collection bin is full, the chassis may be driven to the refuse deposit site and a hydraulically operated, trap door assembly positioned on the bottom of the collection bin may be actuated to release the contents of the collection bin. An electrical monitoring system may also be implemented to alert an operator of the present device to when the collection bin is full.

BRIEF DESCRIPTION OF THE DRAWINGS

FIG. 2b is a top plan, schematic view of the present invention;

FIG. 3 is a perspective view of the paddle and ramp assembly of the present invention;

FIG. 5 is a perspective view of the shaker assembly of the present invention;

FIG. 6a is a perspective view of the catch pans and conveyor of the present invention;

FIG. 6b is a perspective view of the conveyor without a belt mounted thereon;

FIG. 8 is a perspective view of the trap door assembly of the collection bin;

FIG. 9 is a front elevational view of the trap door assembly, taken along line 9—9 of FIG. 8; and FIG. 10 is a perspective view of the present invention's full bin alarm system.

DETAILED DESCRIPTION

Figure 1:
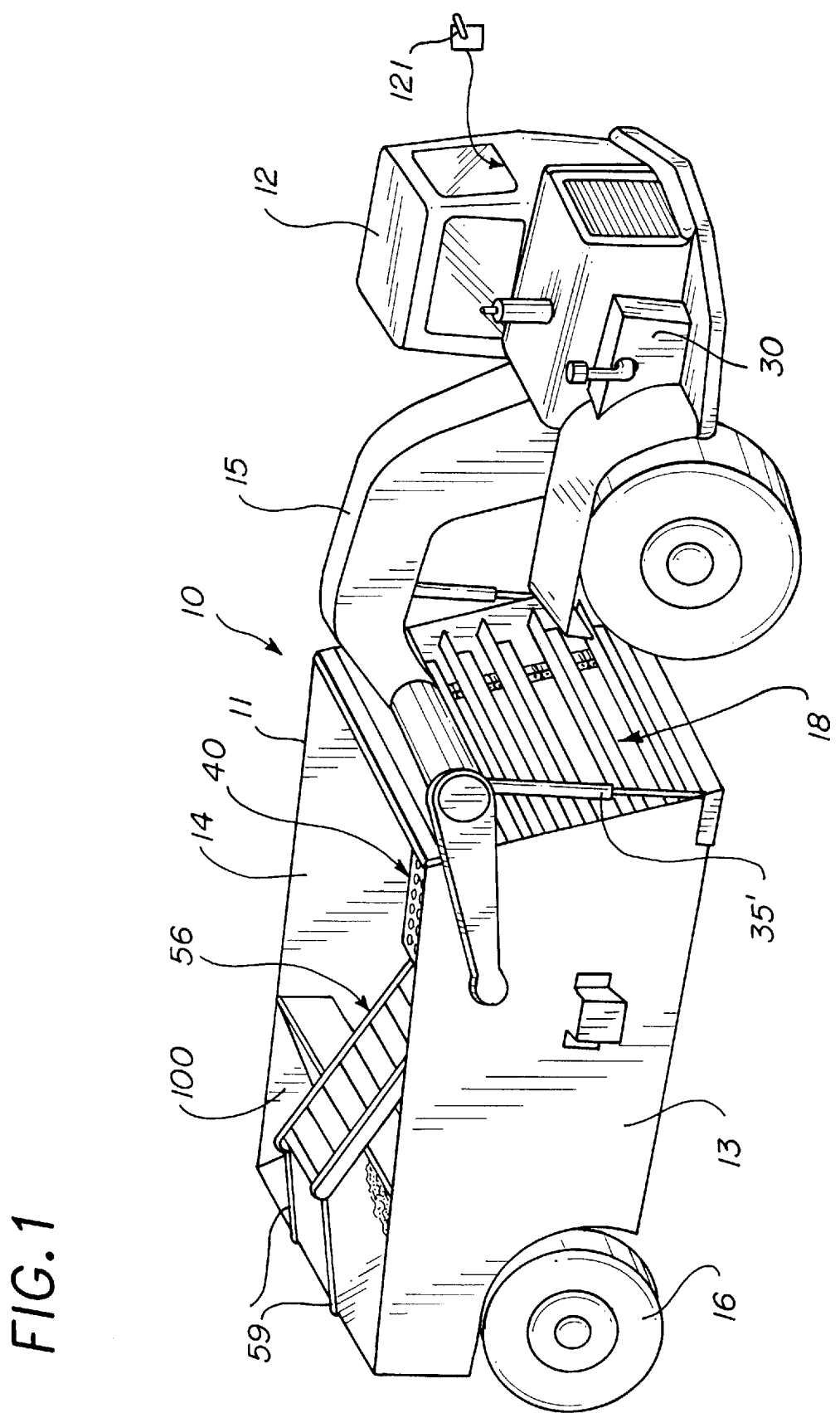
FIG. 1 is a perspective view of the present invention attached to a tractor.
Figure 2A:
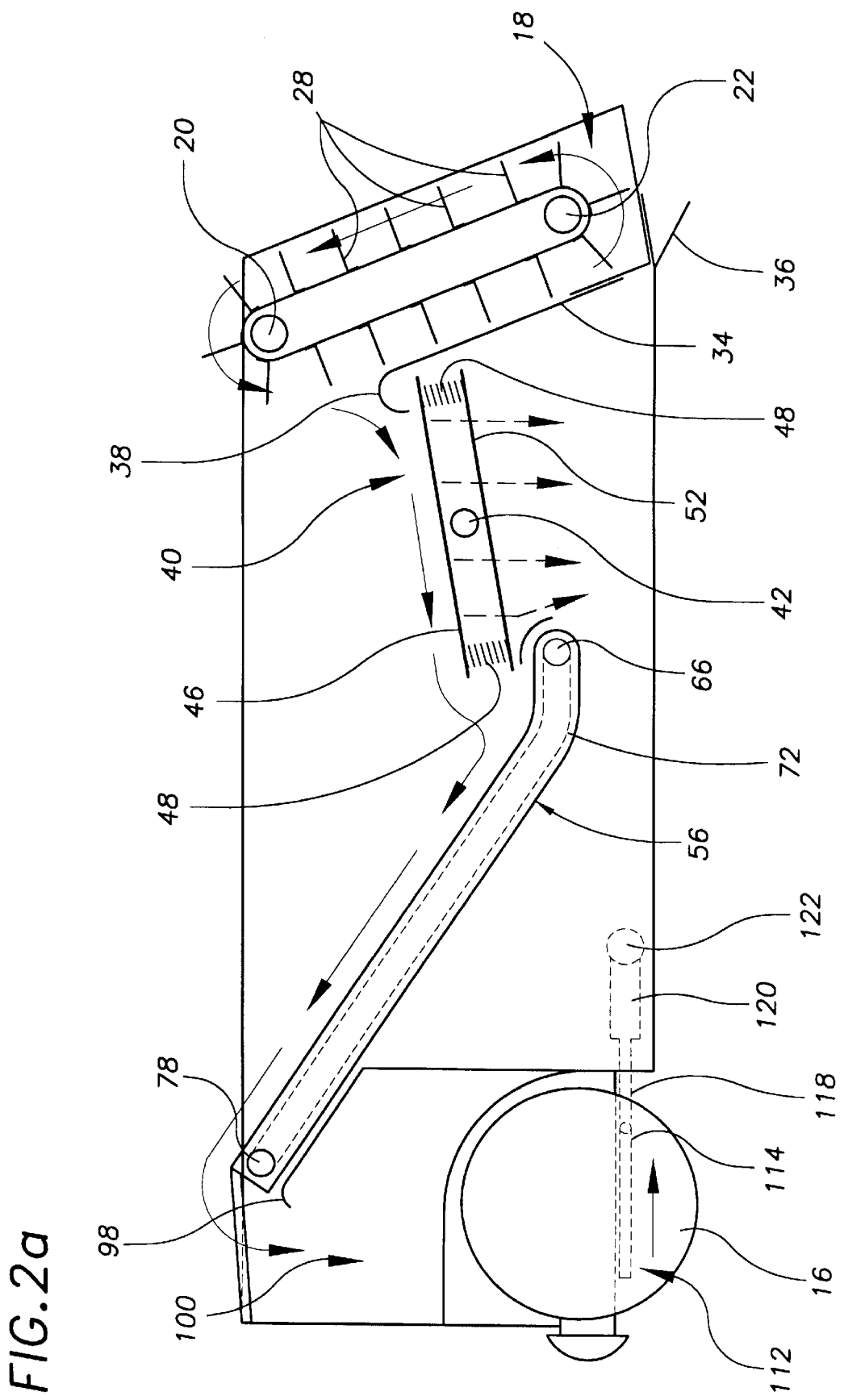
FIG. 2a is a side elevational, schematic view of the present invention.

Referring now to the drawings, wherein like reference numerals refer to like parts throughout, there is seen in FIGS. 1 and 2 a soil treating apparatus, denoted generally by reference numeral 10, being pulled behind a conventional, earth moving tractor 12, common examples of which are manufactured by John Deere, Caterpillar, and Allis Chalmers. Apparatus 10 is embodied in the form of a chassis 14 in which and to which a plurality of soil treating mechanisms are mounted. Chassis 14 includes an open bottom defined by sidewalls 11 and 13 which extend in spaced, parallel planes and are interconnected by the various soil treating mechanisms, as will be explained hereinafter, and a rear wall. To be effectively pulled behind tractor 12, the front end of chassis 14 is adapted to be held above the ground through a connection to the rear portion 15 of tractor 12, and the rear end of chassis 14 is equipped with tires 16 mounted to a conventional axle (not shown) rotatably attached to chassis 14. After an area of soil to be treated has been spread out and rough graded to a desired depth (typically 4–6 inches), driving apparatus 10 over the soil will effect simultaneous removal of debris from the soil and a re-spreading of the debris-free soil.

Reference being had to FIG. 3, a paddle assembly, denoted generally by reference numeral 18, is mounted to sidewalls 11, 13 in a diagonally sloping plane across the entire width of chassis' 14 front end. Paddle assembly 18 includes upper and lower, elongated drive and idler shafts 20 and 22, respectively, laterally offset from one another with each having sprockets 24 and 25, respectively, attached thereto and around which a pair of endless chains 26, 26' extend. A plurality of elongated paddles 28 are mounted in spaced relation to one another, directly to chains 26, 26' (via a bolt, not shown), with each extending in an essentially horizontal plane (parallel relation to the ground). As is conventional with such apparatus, hydraulic fluid is taken from a hydraulic fluid reservoir 30 in tractor 12 and sent through a pump 32 and a hose which extends through the tractor's rear portion 15 and to shaft 20, thereby providing sufficient hydraulic power to cause the shaft to rotate about its longitudinal axis X—X, and hence, cause chains 26, 26' and paddles 28 to rotate around shafts 20 and 22.

A material (soil) directing ramp 34 (clearly seen in FIG. 4) is bolted to opposing sidewalls 11, 13 and extends across the width of chassis 14 in a diagonal plane parallel to and laterally spaced from paddle assembly 18. Ramp 34 includes an elongated cutting edge 36 bolted to and extending along its entire bottom edge. A pair of hydraulic/pneumatic piston and cylinder assemblies 35, 35', controlled by a switch located in the tractor's operator's station, extend between the bottom, front corners of sidewalls 11, 13, respectively, and the tractor's rear end 15. Actuation of assemblies 35, 35' cause cutting edge 36 (as well as the entire chassis 14) to move up or down with respect to the ground, and consequently to dig into and scoop up soil as chassis 14 is pulled in a forward direction by tractor 12. Edge 36 is angled downwardly and its bottom edge is positioned in vertically spaced relation directly beneath shaft 22, thereby bringing the soil up into the path of the revolving paddles 28. Therefore the forward motion of chassis 14 in combination with the continuous digging of cutting edge 36 and the rotation of paddle assembly 18 will cause paddles 28 to continuously collect and carry soil up along the paddle assembly.

When paddles 28 reach the top of assembly 18, but prior to beginning their downward descent along the backside of assembly 18, the soil collected on the paddles falls by gravity to ramp 34. The top edge 38 of ramp 34 is curved in a direction away from paddle assembly 18, thereby causing most, if not all, of the soil falling from paddles 28 to be directed by the ramp's top 38 towards the interior of chassis 14. Any soil that is not directed by the curved top 38 will simply slide down ramp 34 and be re-collected by the revolving paddles 28.

Figure 4:
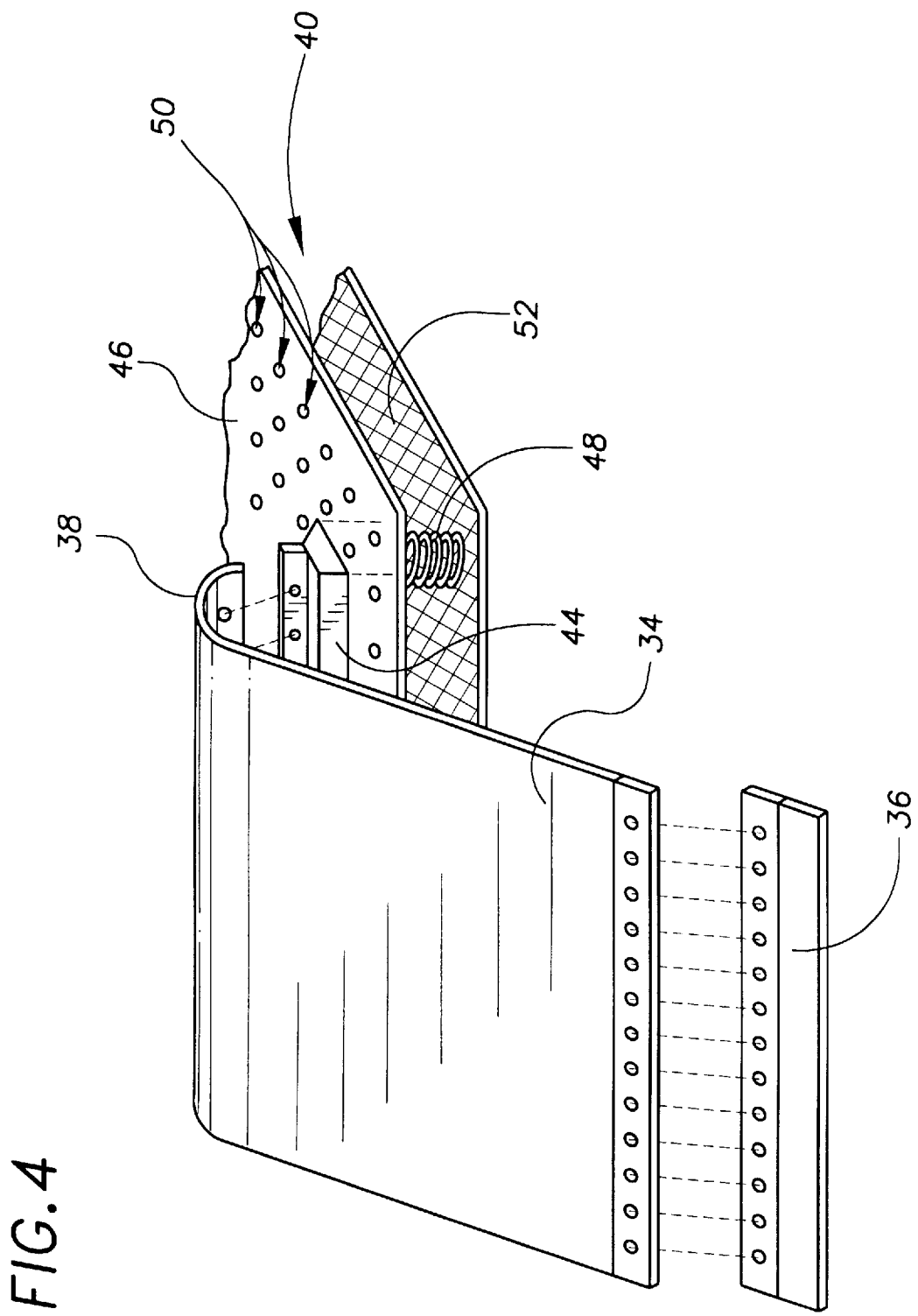
FIG. 4 is a partial perspective view of the ramp and shaker assembly of the present invention.

Referring now to FIGS. 4 and 5, the soil that is directed by the curved top 38, falls onto a conventional, shaker table 40, such as the shaker screens manufactured by Reed Corporation. Shaker table 40 extends across the entire width of chassis 14 and includes side brackets 41 (one shown) bolted onto sidewalls 11, 13. A hydraulic drive assembly 42, conventional with such tables, receives hydraulic fluid via lines extending from reservoir 30 to provide the power necessary to cause a counterweight 43 to move and effect vibration of the table. A rubber deflector 44 is bolted to the edge of curved top 38 and lies flush with table 40 so as to prevent any soil from falling in front of table 40.

The table 40 includes an upper plate 46 mounted atop four springs 48 (positioned at the corners of the table) and which includes a plurality of holes 50 of predetermined diameter formed therethrough. Holes 50 permit soil to pass therethrough while prohibiting debris and rocks above the predetermined diameter from passing through. After the soil passes through the upper screen 46, it then passes through a lower screen 52 having a mesh finer than the holes 50 which is mounted to the bottom of springs 48. Lower screen 52 further breaks up any clumps of soil into finer sized particles and also catches any stray debris that may have passed through upper plate 46. After the filtered soil passes through lower screen 52, it falls through the open floor of chassis 14 and back onto the ground.

Shaker table 40 is mounted to chassis 14 with its front or leading edge 53 raised slightly higher than its rear or trailing edge 55, thereby giving it a front to back slant. Therefore, as the debris become separated from the soil, the vibrations produced by table 40 causes the debris to move towards the rear edge 55, and eventually off of table 40 and onto a conveyor assembly 56.

To prevent debris that has fallen off of the rear edge 55 of table 40 from falling back onto the ground, and to ensure that soil screened near rear edge 55 does fall to the ground, an elongated deflector 54 is mounted directly beneath and in parallel extending relation to rear edge 55. Deflector 54 is slightly, symmetrically curved about its longitudinal axis and includes integral side tabs 65 (only one shown) which bolt to sidewalls 11, 13 and holes formed along its trailing edge for bolting to a pair of catch pans 58, 58' which are positioned one on either side of conveyor assembly 56. The upward curvature of trailing edge of deflector 54 prevents any debris that may fall out of catch pans 58, 58' or off of conveyor assembly 56 from falling to the ground, while the downward curvature of its leading edge ensures that the screened soil will fall towards the ground and not onto conveyor assembly 56.

Figure 6C:
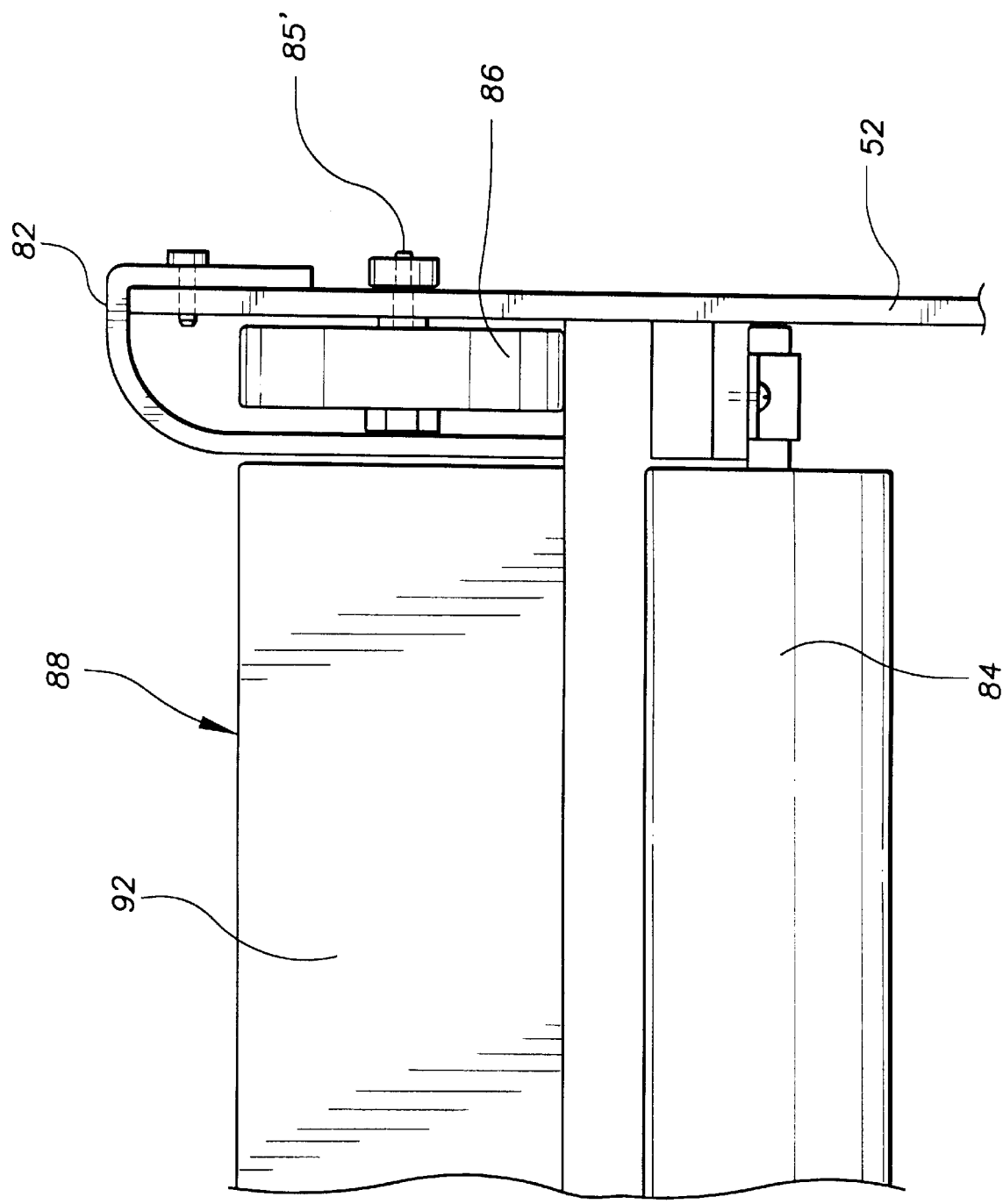
FIG. 6c is an enlarged view of one segment of the conveyor belt configuration.

Referring particularly to FIG. 6a, the two catch pans 58, 58', one on each side of conveyor 56, are bolted to the trailing edge of deflector 54 such that any debris that falls inadvertently from the catch pans towards deflector 54 will be forced directly back into one of the catch pans (or onto the conveyor 56). Catch pans 58, 58' each include a side wall 60 and a tab 61 each of which bolts to sidewalls 11, 13, respectively, of chassis 14, and a rear wall 62 which prevents debris from falling off of catch pans 58, 58' and not onto conveyor 56. The bottom surface 64 of each catch pan 58, 58' slants inwardly so as to cause any debris deposited in the catch pans to slide towards conveyor 56 to which the pans' leading edge 66, 66' sits flush.

FIG. 6a clearly shows that conveyor 56 includes a chassis 57 through which a drive shaft 67 extends. Shaft 67 includes a pair of axially spaced sprockets 68 which engage teeth 70 which are formed in the bottom surface of a conveyor belt 72. The drive shaft 67 is hydraulically actuated by receiving hydraulic oil from a pipe 74 which connects at flange 75 to one end of shaft 67 and extends through sidewall 11 of chassis 14 and is in fluid communication with reservoir 30, which supplies the oil, and pump 32 which regulates the oil pressure. A support pipe 76 extends from the opposite end of drive shaft 67 to sidewall 13 of chassis 14. On its upper end, conveyor 56 includes a pair of struts 59 which attach chassis 57 to rear wall and provide extra support.

Conveyor belt 72 is an endless belt which wraps around drive shaft 67 at its bottom end and an idler shaft 78 at its upper end. Idler shaft 78 includes a pair of axially spaced sprockets 80 which engage teeth 70, and is interconnected to chassis 57 via a belt tension adjuster 81. To ensure that belt 72 remains taut and travels without any slippage, belt tension adjuster 81 includes an elongated slot 83 formed through chassis 57 and through which shaft 78 passes, and a nut 85 for locking shaft 78 in a desired position with respect to slots 83. Thus, by altering the position of shaft 78 within slots 83, the tension in belt 72 will be accordingly altered.

To provide for the smooth travel of belt 72 around shafts 67 and 78, the bottom surface of the belt is positioned in contacting relation upon a plurality of rollers 84 mounted for rotation about their respective longitudinal axes to chassis 57. Hence, as belt 72 moves around shafts 67 and 78, rollers 84 rotate about their longitudinal axes at an essentially identical rate of speed. In order to prevent belt 72 from rising above rollers 84 and perhaps off its track, a plurality of idler wheels 86 (FIG. 6c) are mounted to chassis 57, via respective bolts 85, for rotation about their respective central axes. The top surface of belt 72 is in contacting relation to each of idler wheels 86 with the idler wheels rotating as belt 72 travels around shafts 67 and 78. Thus, by sandwiching belt 72 between rollers 84 and idler wheels 86 the belt will travel smoothly around shafts 67 and 78 and will not become disengaged from sprocket pairs 68 or 80. Guard rails 87 are bolted onto chassis 57 in covering relation to idler wheels 86 in order to prevent material being carried upon belt 72 from coming into contact with and damaging the idler wheels.

To effectively carry material up conveyor 56, a plurality of conveyor paddles 88 are mounted in spaced, parallel relation transversely across belt 72 and in the entire width between the inner surfaces of guard rails 87. Paddles 88 are 90 degree metal angle irons wherein one strip 90 is bolted to belt 72 and the other strip 92 extends 90 degrees upwardly from the belt's upper surface. Strip 92 prevents any debris being carried up conveyor 56 from sliding down belt 72.

The lowermost portion of conveyor 56, where debris is first loaded onto belt 72 from shaker 40, extends along a straight run prior to beginning an ascent, at which point conveyor 56 forms an obtuse angle α. To prevent belt 72 from rubbing against conveyor chassis 57 at its angled portion, a pair of idler rollers 96, one on each side of the portions of chassis 57 at which the angle α is formed, are bolted to the outwardly facing sides of conveyor chassis 57 such that they extend in parallel relation to rollers 84, but beneath chassis 57 as opposed to within chassis 57 (as do rollers 84). Belt 72 extends in contacting relation to the underside of idler rollers 96, which rotate about their respective longitudinal axes in response to the belt revolving around shafts 67 and 78, thereby preventing the belt from rubbing against chassis 57.

Once the debris being transported by conveyor 56 reaches the top thereof, it is dumped into a collection bin 100 to which a shoot 98 is bolted on its underside. Shoot 98 is positioned directly beneath the trailing edge of conveyor 56 and is curved downwardly along its edge 102 positioned adjacent conveyor 56 in order to provide clearance for belt 72 and paddles 88 as they travel around shaft 78. From edge 102, shoot 98 slopes downwardly to its opposite edge 104 which is positioned within the mouth of bin 100 (see FIG. 10). Another aspect of shoot 98 is that it protects belt 72 and paddles 88 from being damaged by excess debris that may fall out of collection bin 100 in the event that it overflows.

Figure 7:
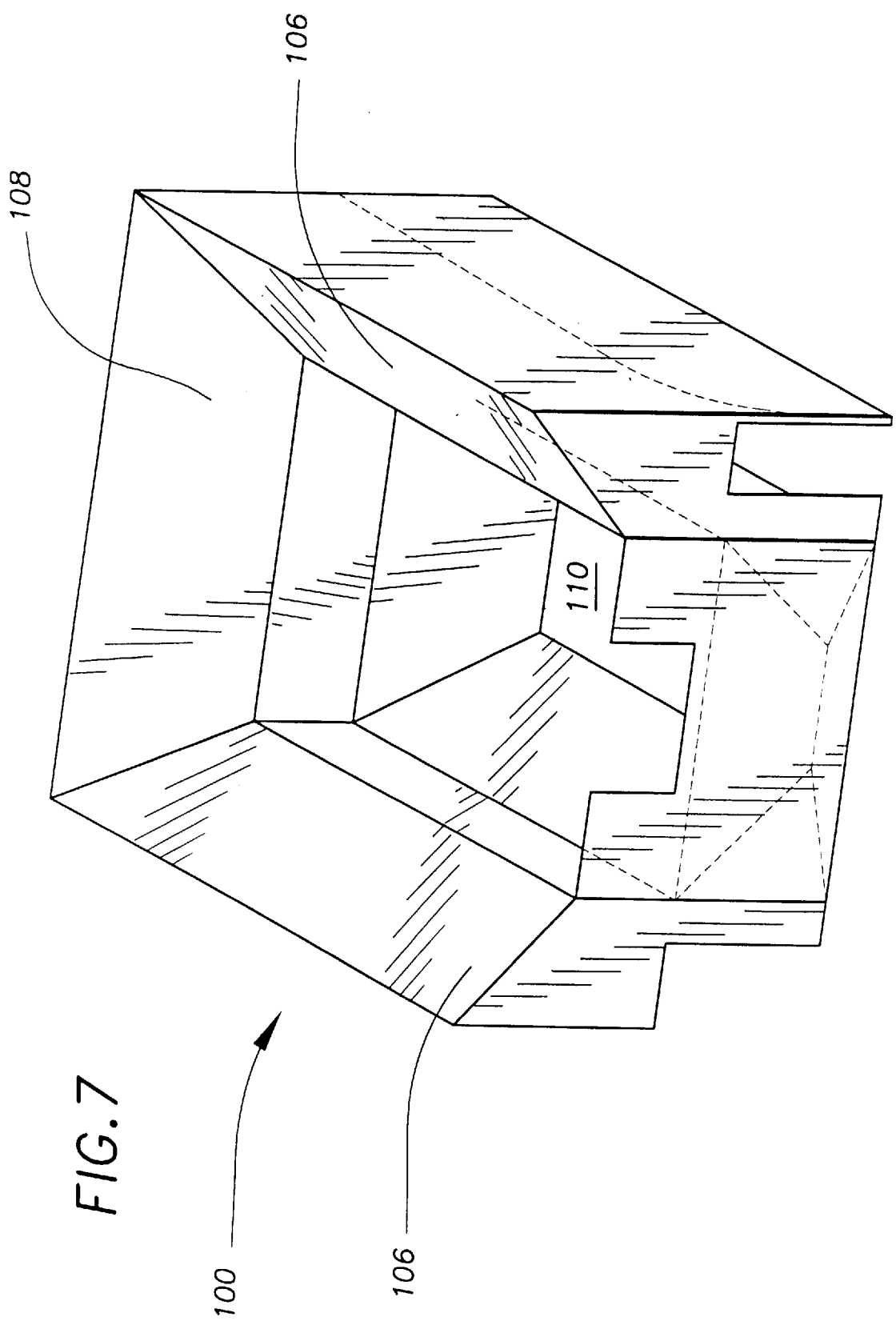
FIG. 7 is a perspective view of the collection bin of the present invention.

Collection bin 100 (see FIG. 7) extends across the entire width of and adjacent the rear end of chassis 14, and is securely bolted to sidewalls 11, 13. Conveyor 56 dumps debris over the front edge of bin 100, and any debris that may not fall directly to the bottom of the bin is directed there by the bin's inwardly sloping side and rear walls 106 and 108, respectively.

The bottom 110 of bin 100 includes a trap door assembly 112 (see FIGS. 8–9) which is hydraulically actuable between open and closed positions. The door 114 includes a plate 116 securely attached thereto, as well as to the end of a piston 118. A hydraulic cylinder 120, into and out of which piston 118 moves, is mounted to a bar 122 which extends across and is mounted to sidewalls 11, 13 of chassis 14. Cylinder 120 is selectively actuated via a switch 121 (not shown) positioned in the tractor's operator's station, thereby permitting a user to selectively open or close door 114. Hence, once bin 100 is filled with debris, the user may drive apparatus 10 over to a dump site, hydraulically cause door 114 to open and dump all the debris in bin 100 out, close door 114 and then continue with the excavating job.

To further provide a smooth operation of trap door assembly 112, a cover plate 124 is securely mounted in covering relation to cylinder 120 and piston 118, thereby protecting those elements from the debris as it is released from bin 100. In addition, door 114 slides open and closes in tracks 123 having a plurality of idler wheels 125 mounted therein so as to reduce friction and require less pressure from piston 118 in order to effect movement of door 114. Finally, a pair of rubber, stop blocks 126 are fixedly attached to the bottom of bin 100 in order to prevent door 112 from being pushed out of engagement with idler wheels 125.

With reference being had to FIG. 10, an option to the present system, as seen in FIG. 10, is an alarm system, denoted generally by reference numeral 128, which alerts the operator of apparatus 10 to where bin 100 is full and needs to be emptied. Alarm system 128 includes a plate 130 hingedly mounted to an elongated pin 132, and a fixed plate 134, also attached to pin 132, which extends in a horizontal plane (essentially parallel to the ground) and slightly below shoot 98. A pair of mounting blocks 136 are fixedly attached to plate 134 and each includes a spring 138 attached at one end thereto and at their other ends to plate 130, thereby interconnecting plates 130 and 134. Further mounted to plate 134 is a push button alarm trigger 140 and a pair of stop blocks 142 which prevent plate 130 from damaging alarm trigger 140, as will be explained hereinafter.

As debris begins to pile up and reach the top of bin 100, it will come into contact with plate 130. Due to the downwardly sloping faces of the bin's walls and plate 130 being positioned adjacent the front edge of bin 100, the debris will come into contact with the plate's rearwardly facing surface. As the debris continues to fall into bin 100, plate 130 will be forced to pivot about pin 132, and when the debris has completely filled bin 100, plate 130 will be in contacting relation to alarm trigger 140, thereby depressing the trigger's push button. Stop blocks 138, which are of a slightly greater width than the mount of trigger 140, prevent plate 130 from contacting the mount portion of trigger 140 (e.g., stop blocks 138 are engaged by plate 130 once the push button of trigger 140 has been depressed by plate 130).

Once the button of trigger 140 is depressed, a signal, i.e., conventional infra red, radio frequency, or hard wire signal, is sent to a buzzer alarm receiver 142 mounted in the tractor's operator's station, thereby alerting the driver that bin 100 is full. The driver can, accordingly, drive apparatus to the refuse site, actuate trap door assembly 112 in the manner previously described, and then continue with the job.

What is claimed is:

1. Apparatus for separating debris from soil comprising:
   a) a vehicle chassis having a front end and a predetermined width defined by first and second sidewalls held in spaced, parallel relation to one another by a rear wall, said first and second sidewalls and said rear wall defining an open bottom to said chassis;
   b) a paddle assembly positioned across said chassis' width at said front end, and having:
      i) longitudinally elongated drive and idler shafts each being rotatable about its longitudinal axis and each including at least one sprocket attached thereto, said drive and idler shafts each extending across said chassis' width and in vertically spaced, parallel relation with respect to the other, said drive shaft being rotatably attached to said first and second sidewalls;
      ii) a first plurality of elongated paddles extending across said chassis' width and in spaced parallel relation to one another, said paddles including a surface upon which soil may be carried, said first paddles being mounted for rotational movement around said drive and idler shafts;
      iii) at least one chain drive to which of said first paddles is fixedly secured, said at least one chain drive being positioned in encircling relation around said drive and idler shafts and in engaging relation with said at least one sprocket; and
      iv) power supply means for causing said drive shaft to rotate about its longitudinal axis;
   c) a vibratory table for sifting and separating debris from said soil, said table having a plate mounted atop a plurality of springs and including a plurality of holes of predetermined size formed therethrough, said plate being attached to said first and second sidewalls across said chassis' width, and having a front edge positioned adjacent said paddle assembly and a downward slope to a rear edge, whereby soil carried by said first paddles may fall to said table after said first paddles rotate around said drive shaft and said debris will be separated from said soil and will slide down said table from said front edge to said rear edge;
   d) a debris collection bin mounted across said chassis' width adjacent said rear wall, said collection bin including an open top, opposing side walls and a bottom surface, said bottom surface including a door through which said debris may be released from said bin and which is remotely, selectively actuable between open and closed positions; and
   e) conveyor means attached to said first and second sidewalls for receiving debris from said vibratory table and conveying said debris to said collection bin.

2. The apparatus according to claim 1 wherein said first paddles include an elongated first surface which is bolted to said at least one chain drive, and an elongated second surface integral with said first surface and disposed 90 degrees therefrom, said second surface extending in an essentially horizontal plane as it rotates between said drive and idle shafts.

3. The apparatus according to claim 1 wherein said power supply means is a hydraulic oil reservoir and pump positioned in fluid communication with said drive shaft, whereby when said hydraulic oil is flowing into said upper shaft, it rotates about its longitudinal axis.

4. The apparatus according to claim 1 wherein said vibratory table is hydraulically actuated and includes a counterweight which moves in response to said hydraulic actuation and produces said vibration.

5. The apparatus according to claim 4 wherein said vibrations cause soil and debris smaller than said predetermined size of said holes formed through said table to fall therethrough, while prohibiting debris above said predetermined size from falling therethrough.

6. The apparatus according to claim 5 wherein said vibratory table further includes a screen having holes smaller than said predetermined size formed therethrough, said screen being attached to the bottom of said springs and extending in a plane parallel to and vertically spaced beneath said table, whereby said soil that passes through said plate falls to said screen and then through said chassis' open bottom if small enough to pass through said screen.

7. The apparatus according to claim 1 and further comprising a soil directing ramp extending across said chassis' width and attached to said first and second sidewalls, said ramp being positioned between said paddle assembly and said vibratory table, said ramp including an upper edge which is curved away from said paddle assembly and a lower edge, wherein soil dropped from said paddle, after passing around said drive shaft will fall to said ramp's upper edge which will direct said soil to said vibratory table.

8. The apparatus according to claim 7 and further comprising a cutting edge fixedly attached to and extending downwardly from said bottom edge of said ramp, said cutting edge being forwardly biased to dig into and scoop up soil as said apparatus travels in a forward direction, whereby said soil scooped up by said cutting edge is picked up and carried by said first paddles.

9. The apparatus according to claim 1 wherein said conveyor means is comprised of:

a) a conveyor chassis which includes first and second siderails having inwardly and outwardly facing surfaces, extending in spaced, parallel relation to one another on an upward slope between the first and second, terminal edges which are positioned adjacent to said vibratory table and to said collection bin, respectively;

b) a plurality of elongated rollers extending in parallel, spaced relation to one another and in between said first and second siderails, said rollers being mounted to said first and second siderails for rotation about their respective longitudinal axes;

c) second and third drive shafts positioned at said first and second terminal edges, respectively, of said conveyor chassis, said second and third shafts each having at least one sprocket attached thereto, said shafts extending in parallel relation to said rollers;

d) a conveyor belt which extends across the entire distance in between said first and second sidewalls and around said second and third drive shafts and includes teeth which are positioned for engagement with said sprockets, said conveyor belt having an upper surface and a lower surface which lies in contacting, covering relation to said rollers; and e) a plurality of second paddles fixedly attached to and extending upwardly from said upper surface of said conveyor belt, said plurality of second paddles extending in spaced, parallel relation to one another transversely across said conveyor belt, whereby said debris being carried upon said conveyor belt is prohibited by said second paddles from sliding down said conveyor belt as it travels along said conveyor chassis' upward slope.

10. The apparatus according to claim 9 wherein said conveyor means further includes a plurality of idler wheels axially, rotatably mounted to said inwardly facing surfaces of each of said first and second siderails, said wheels being positioned in contacting relation to said upper surface of said conveyor belt.

11. The apparatus according to claim 10 and further comprising first and second guard rails mounted to said first and second siderails, respectively, in covering relation to said idler wheels, whereby said debris being carried by said conveyor belt is prevented by said first and second guard rails from contacting said idler wheels.

12. The apparatus according to claim 9 and further comprising first and second catch pans each having an inward edge attached to said outwardly facing surfaces of said first and second siderails, respectively, and an outward edge attached to said first and second chassis sidewalls, respectively, and each of said first and second catch pans having a front edge positioned adjacent said rear edge of said vibratory table.

13. The apparatus according to claim 12 wherein said first and second catch pans each include a bottom surface which slopes inwardly towards said conveyor belt.

14. The apparatus according to claim 1 and further comprising means for indicating when said collection bin is full of said debris.

15. The apparatus according to claim 14 wherein said indicating means is comprised of:

a) an alarm;

b) an elongated pin extending perpendicularly inwardly from said first sidewall across said open top of said collection bin;

c) a first plate hingedly connected to and hanging downwardly from said pin into said collection bin, adjacent said collection bin's front edge;

d) a second plate fixedly attached to and extending along said pin and lying in an essentially horizontal plane;

e) at least one spring having first and second ends fixedly attached to said first and second plates, respectively; and f) a push button alarm trigger fixedly attached to said second plate which upon being depressed actuates said alarm, whereby as said debris fills said collection bin, it contacts said first plate pushing it towards said second plate until said first plate contacts said push button alarm trigger, thereby actuating said alarm and indicating that said collection bin is full of said debris.

16. Apparatus for separating debris from soil comprising:

a) a vehicle chassis having a front end and a predetermined width defined by first and second sidewalls held in spaced, parallel relation to one another by a rear wall, said first and second sidewalls and said rear wall defining an open bottom to said chassis;

b) a paddle assembly positioned across said chassis' width at said front end, and having:

i) longitudinally elongated drive and idler shafts each being rotatable about its longitudinal axis and each including at least one sprocket attached thereto, said drive and idler shafts each extending across said chassis' width and in vertically spaced, parallel relation with respect to the other, said drive shaft being rotatably attached to said first and second sidewalls;

ii) a first plurality of elongated paddles extending across said chassis' width and in spaced parallel relation to one another, said paddles including a surface upon which soil may be carried, said first paddles being mounted for rotational movement around said drive and idler shafts;

iii) at least one chain drive to which of said first paddles is fixedly secured, said at least one chain drive being positioned in encircling relation around said drive and idler shafts and in engaging relation with said at least one sprocket; and iv) power supply means for causing said drive shaft to rotate about its longitudinal axis;

c) a vibratory table for sifting and separating debris from said soil, said table having a plate mounted atop a plurality of springs and including a plurality of holes of predetermined size formed therethrough, said plate being attached to said first and second sidewalls across said chassis' width, and having a front edge positioned adjacent said paddle assembly and a downward slope to a rear edge, whereby soil carried by said first paddles may fall to said table after said first paddles rotate around said drive shaft and said debris will be separated from said soil and will slide down said table from said front edge to said rear edge;

d) a debris collection bin mounted across said chassis' width adjacent said rear wall, said collection bin including an open top, opposing side walls and a bottom surface;

e) means for indicating when said collection bin is full of said debris; and f) conveyor means attached to said first and second sidewalls for receiving debris from said vibratory table and conveying said debris to said collection bin.

17. The apparatus according to claim 16 wherein said indicating means is comprised of:

a) an alarm;

b) an elongated pin extending perpendicularly inwardly from said first sidewall across said open top of said collection bin;

c) a first plate hingedly connected to and hanging downwardly from said pin into said collection bin, adjacent said collection bin's front edge;

d) a second plate fixedly attached to and extending along said pin and lying in an essentially horizontal plane;

e) at least one spring having first and second ends fixedly attached to said first and second plates, respectively; and f) a push button alarm trigger fixedly attached to said second plate which upon being depressed actuates said alarm, whereby as said debris fills said collection bin, it contacts said first plate pushing it towards said second plate until said first plate contacts said push button alarm trigger, thereby actuating said alarm and indicating that said collection bin is full of said debris.

* * * * *

UNITED STATES PATENT AND TRADEMARK OFFICE
CERTIFICATE OF CORRECTION

PATENT NO. : 5,816,334
DATED : October 6, 1998
INVENTOR(S) : Barry Haggerty

It is certified that error appears in the above-indentified patent and that said Letters Patent is hereby corrected as shown below:

<u>In The Claims</u>

Claim 2, line 7, delete "idle" and substitute therefor --idler--.

Signed and Sealed this

Thirtieth Day of March, 1999

Attest:

Q. TODD DICKINSON

Attesting Officer

Acting Commissioner of Patents and Trademarks